2,695,262

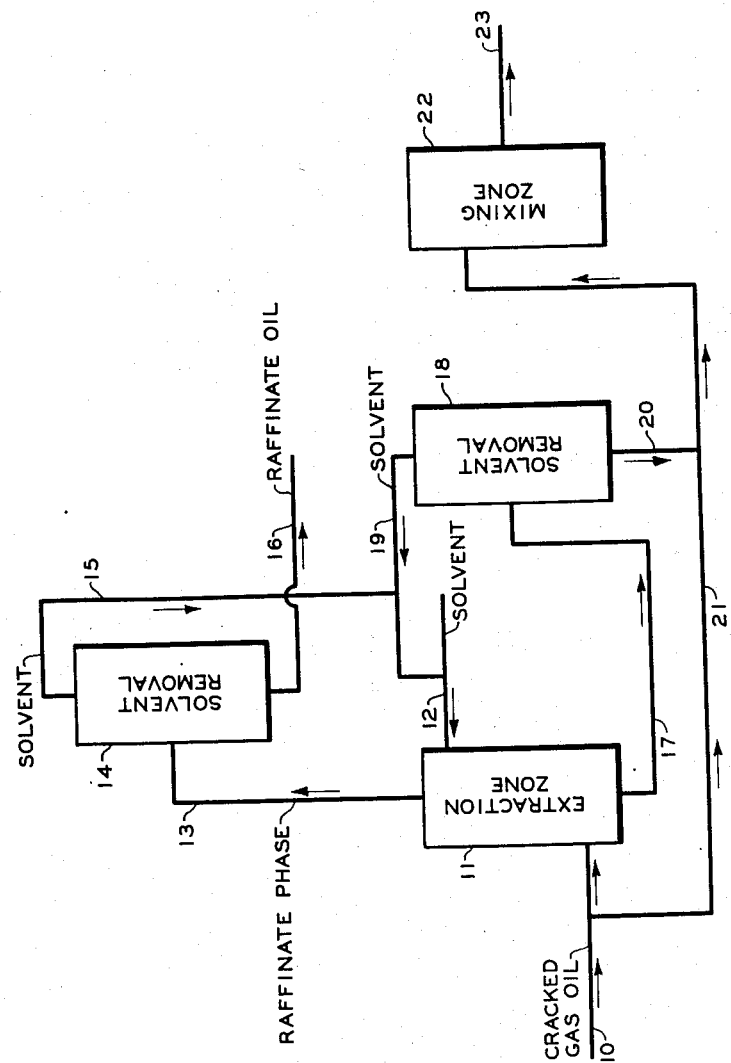
INVENTOR.
E. V. MATHY 2,695,262
Patented Nov. 23, 1954

PRODUCTION OF LOW ANILINE POINT OIL

Eugene V. Mathy, Bartlesville, Okla., assignor to Phillips Petroleum Company, a corporation of Delaware Application December 22, 1949, Serial No. 134,403

3 Claims. (Cl. 196—14.26)

This invention relates to the production of oils of specific aniline point. A more specific aspect of this invention relates to an economical process for reducing the aniline point of an aromatic hydrocarbon oil or in other words increasing the aromaticity of the oil. A preferred embodiment of this invention relates to the production of an aromatic hydrocarbon feed of optimum aniline point for use in the production of furnace black, from an oil of too high aniline point.

Furnace black is one of two types of carbon black produced in considerable quantity today, the other being channel black. The methods of manufacture of each is considerably different from the other as are the properties of the products. Channel black is produced by burning natural gas in a great number of small burners and recovering the carbon black so produced by depositing same on a metal channel suspended just above each burner. Furnace black is produced by burning hydrocarbons ranging from methane to asphalt with an insufficient quantity of oxygen for complete combustion, in large refractory-lined furnaces. The carbon formed by the decomposition of the feed is collected in many ways such as by water spray, electrical precipitators, and cyclone separators.

The characteristics of the blacks produced by the two processes are different: the furnace black being higher in fixed carbon, lower in volatile matter, less hydrophilic. In addition, furnace black is alkaline with a pH running as high as 10 while channel black is acid having a pH generally in the range of 4 to 5 or less, and the color of furnace black is generally lighter than that of channel black.

Furnace black has a multitude of uses in industry, probably the most extensive of which is in the manufacture of products such as tires from natural and synthetic rubbers. Other uses are in pigments, carbon paper, typewriter ribbons, printing inks, roofing compounds, metal coatings, extenders for plastics, and as replacements for lamp black and bone black.

Many types of oils have been used in the production of furnace carbon black, and it has been found that oils of certain character provide better carbon black products than others. It has been found that a very desirable quality of furnace black may be produced when an oil feed is used having an aniline point in the range of 25 to 65° F. and that such black may be produced in high yield.

Aniline point as referred to herein is merely an indication of the aromaticity of an oil and is determined by admixing equal quantities of aniline and the oil to be tested and determining the minimum equilibrium solution temperature, i. e. the temperature at which the aniline and oil form separate phases. This temperature is called the aniline point.

An object of this invention is to provide an improved process for the production of a specific aniline point oil. Another object of this invention is to provide an economical process for the manufacture of a specific aniline point oil from an oil of higher aniline point.

Another object is to increase the aromaticity of a hydrocarbon oil.

Another object is to provide an oil for the manufacture of carbon black.

Another object is to increase the yield of oil of a particular aniline point.

Still another object is to provide a process for the manufacture of an oil having an optimum aniline point for use in the manufacture of furnace blacks.

Other objects and advantages of this invention will be apparent to one skilled in the art from the accompanying disclosure and discussion.

I have discovered an improved and economical process for obtaining an oil of the desired aniline point, i. e. desired aromaticity, suitable for use as feed to carbon black manufacturing processes, particularly furnace black manufacture, in yields considerably greater than heretofore obtained.

In accordance with my process an oil of an aniline point higher than that desired for use in the manufacture of furnace black, such as a cracked gas oil, is liquid-liquid solvent extracted to provide an extract of low aniline point (high aromaticity) and a raffinate of high aniline point (low aromaticity). Suitable solvents for such an extraction are furfural, methyl cellosolve, nitrobenzene, liquid sulfur dioxide, and other known selective solvents, furfural usually being preferred. Obviously, it is within the scope of the invention also to use mixtures of these solvents. The extract phase of low aniline point is treated to remove the solvent and is then blended back with a portion of the unextracted feed thereby increasing the aromatic content of the feed oil and reducing the overall aniline point to within the desired range for furnace black manufacture. Usually this aniline point range is between 25 and 65° F., however it may be higher or lower than this. The upper limit may generally be about 120° F., but the lower limit is only restricted by economics. This latter limit depends on where the highest price may be obtained for the oil, i. e., by turning it into carbon black or into some other product.

By practicing this process only a portion of the high aniline point material, otherwise satisfactory as a furnace black feed, is treated in the extraction zone. This is a very definite advantage over the treatment of all of the feed stock for carbon black manufacture, particularly because the size of the treating equipment may be considerably reduced, the solvent requirements are lessened, the energy expended for heating, cooling and the like is considerably reduced, and yet a greater quantity of proper aniline point oil is obtained.

Due to the rather high freezing point of aniline, those aniline points below about 25° F. are not satisfactory. Therefore the aniline point of the oil produced in the example was determined by interpolation of the furfural point, which has been found to correlate well with the aniline point in a straight line relationship. The following equation represents the method for arriving at the aniline point of an oil by determining first the furfural point:

$$AP = 1.04 FP - 67$$

AP designates aniline point, and FP designates furfural point.

In a preferred embodiment of this invention the raffinate phase, that is, the gas oil of high aniline point, is passed to solvent removal and is recovered therefrom for use as a cracking feed, for burning oil, for diesel fuel, or for other purposes requiring an oil of low aromaticity.

I have further found that the aniline point of the extract oil will be decreased with decreasing temperature of extraction, the solvent to oil ratio remaining constant, and will also be decreased when the solvent to oil ratio is decreased, the temperature remaining the same. This is apparently due to the fact that less paraffinic material is dissolved with the aromatic compounds.

Usually, I prefer to feed a cracked gas oil boiling in the range of, say, 450 to 750° F. and having an aniline point in the range of 125 to 160° F. to the extraction zone and to blending with the extract. When using furfural as the solvent, ratios of solvent to feed are preferably in the range of 0.5 to 5 volumes per volume while the operating temperatures of the extraction zone are maintained in the range of 50 to 160° F. Suitable pressures are those which will maintain the oil and solvent in liquid phase. Operating under these conditions an extract oil having an aniline point between −75 and +20° F. is produced. Suitable conditions for other solvents will readily be determined by those skilled in the art. Any suitable contacting or extraction chamber may be used, in the practice of my invention, however, I find that most satisfactory operation may be had by using countercurrent extraction chambers arranged in either single-stage or multi-stage.

A more full understanding of my invention may be had by referring to the attached drawing which is a schematic flow diagram of a preferred embodiment of my invention. Valves, pumps and other conventional equipment have been left out of the drawing for the sake of simplicity, however, the incorporation of such equipment in a plant process is well within the skill of the art.

Refer now to the drawing. A cracked gas oil or similar feed of low aromaticity and moderate to high aniline point is passed via line 10 to extraction zone 11 where it is contacted in countercurrent relationship with an extractive solvent introduced via line 12. The extract phase which is highly aromatic is removed from zone 11 and passed to solvent removal zone 18 via line 17. In zone 18 the solvent is removed from the extract, such as by stripping or by the use of a secondary solvent for the extract in known manner, and is recycled via line 19 to line 12 through which it is passed back to the extraction zone. The solvent-free extract is then removed from zone 18 via line 20 through which it is passed, along with a suitable volume of cracked gas oil such as that fed to extraction zone 11, which is passed to line 20 through line 21. The admixture of the low and high aniline point oils in line 20 may be thoroughly accomplished by turbulent flow or by passing same to mixing zone 22 equipped with any suitable mechanical mixing device. The blended oil of desired aniline point is removed from mixing zone 22 via line 23 and is passed therefrom to furnace black manufactuer or other suitable use.

The raffinate phase in extraction zone 11 is removed therefrom via line 13, and is passed to solvent removal zone 14. Here again, the solvent may be removed from the oil by stripping or by the use of secondary solvents or other means, which processes are well known to those skilled in the art. The solvent withdrawn through line 15 is also recycled to extraction zone 11 via lines 19 and 12. The raffinate oil which is of high aniline point is passed from solvent removal zone 14 via line 16 to storage or to such processes as hereinabove enumerated or to other suitable use. Make-up solvent for the extraction of the cracked gas oil is supplied to zone 11 through line 12.

By so operating my process I have found that a higher yield of oil of the desired aniline point is obtained than would have been obtained had the total gas oil been extracted to produce an extract oil of the same aniline point. In addition a smaller quantity of oil is processed and a smaller amount of solvent is necessary for use in the extraction. Consequently, a further saving in equipment is effected.

Advantages of this invention are illustrated by the following examples. The reactants and their proportions, and other specific ingredients are presented as being typical and should not be construed to limit the invention unduly.

*Example I*

A 150° F. aniline point cracked gas oil was extracted to yield a —60° F. aniline point extract. This extract was blended with a portion of the original cracked gas oil to produce a 50° F. aniline point product. The yield of 50° F. aniline point oil was 33 volume per cent based on the total original oil used.

In a comparative operation, another portion of the 150° F. aniline point cracked gas oil was extracted to produce directly an extract oil of 50° F. aniline point. The yield of this extract oil was 29 volume per cent based on the oil treated.

*Example II*

A 150° F. aniline point gas oil is extracted at a solvent-to-oil ratio of 2 to yield 20° F. aniline point extract. This extract is blended with a portion of the original oil to produce a 50° F. aniline point oil in a 29.5 per cent yield. Extraction of the original oil to 50° F. aniline point produces only a 27.5 per cent yield.

The conclusion which may be drawn from these two examples is that the lower the aniline point to which a portion of the oil is extracted before blending with unextracted oil, the greater will be the yield of the desired aniline point oil over the yield which would have been obtained by direct extraction of the total oil.

Although this process has been described and exemplified in terms of its preferred modifications, it is understood that various changes may be made without departing from the spirit and scope of the disclosure and of the claims.

I claim:

1. A process for producing a hydrocarbon product having a predetermined aniline point lower than the aniline point of the feed stock from which it is produced and in greater yield than is obtained by solvent extracting the entire hydrocarbon feed stock to said predetermined aniline point for use in the manufacture of a furnace carbon black and for the production of a paraffinic oil which comprises, dividing a gas oil feed stock of aniline point within the range of 125° to 160° F. and boiling within the range of 450° to 750° F., into two portions, each portion having said aniline point range and said boiling point range, solvent extracting one portion of said gas oil with a solvent preferential to aromatic hydrocarbons to an aniline point of —75° to 25° F., the volume ratio of said solvent to said one portion of said gas oil being in the range of 0.5:1 to 5:1, carrying out this extraction operation at a temperature within the range of 50° to 160° F., from this extraction operation separating an aromatic hydrocarbon oil rich phase and a paraffinic hydrocarbon oil rich phase, separating solvent from each of said phases and recycling the separated solvent to the extraction operation, recovering the solvent-free paraffinic hydrocarbon oil as a paraffinic gas oil, admixing the solvent-free aromatic hydrocarbon oil with the other portion of said gas oil feed stock and recovering this admixture as said hydrocarbon product having a predetermined aniline point lower than the aniline point of the feed stock from which it is produced and in a greater yield.

2. A process for producing a hydrocarbon product having a predetermined aniline point lower than the aniline point of the feed stock from which it is produced and in a greater yield than is obtained by solvent extracting the entire hydrocarbon feed stock to said predetermined aniline point for use in the manufacture of a furnace carbon black and for the production of a paraffinic oil which comprises, dividing a gas oil feed stock of aniline point within the range of 125° to 160° F. and boiling within the range of 450° to 750° F., into two portions, each portion having said aniline point range and said boiling point range, solvent extracting one portion of said gas oil with a solvent selected from the group consisting of furfural, methyl cellosolve, nitrobenzene, and liquid sulfur dioxide to an aniline point of —75° to 25° F., the volume ratio of said solvent to said one portion of said gas oil being in the range of 0.5:1 to 5:1, carrying out this extraction operation at a temperature within the range of 50° to 160° F., from this extraction operation separating an aromatic hydrocarbon oil rich phase and a paraffinic hydrocarbon oil rich phase, separating solvent from each of said phases and recycling the separated solvent to the extraction operation, recovering the solvent-free paraffinic hydrocarbon oil as a paraffinic gas oil, admixing the solvent-free aromatic hydrocarbon oil with the other portion of said gas oil feed stock and recovering this admixture as said hydrocarbon product having a predetermined aniline point lower than the aniline point of the feed stock from which it is produced and in a greater yield.

3. A process for producing a hydrocarbon product having a predetermined aniline point lower than the aniline point of the feed stock from which it is produced and in a greater yield than is obtained by solvent extracting the entire hydrocarbon feed stock to said predetermined aniline point for use in the manufacture of a furnace carbon black and for the production of a paraffinic oil which comprises, dividing a gas oil feed stock of aniline point within the range of 125° to 160° F. and boiling within the range of 450° to 750° F., into two portions, each portion having said aniline point range and said boiling point range, solvent extracting one portion of said gas oil with furfural to an aniline point of —75° to 25° F., the volume ratio of said furfural to said one portion of said gas oil being in the range of 0.5:1 to 5:1, carrying out this extraction operation at a temperature within the range of 50° to 160° F., from this extraction operation separating an aromatic hydrocarbon oil rich phase and a paraffinic hydrocarbon oil rich phase, separating solvent from each of said phases and recycling the separated solvent to the extraction operation, recovering the solvent-free paraffinic hydrocarbon oil as a paraffinic gas oil, admixing the solvent-free aromatic hydrocarbon oil with the other portion of said gas oil feed stock and recovering this admixture as said hydrocarbon product having a predetermined aniline point lower than the aniline point of the feed stock from which it is produced and in a greater yield.

References Cited in the file of this patent

UNITED STATES PATENTS

| Number | Name | Date |
|---|---|---|
| 1,585,473 | Edeleanu | May 18, 1926 |
| 2,114,524 | Egli | Apr. 19, 1938 |
| 2,139,668 | Breth et al. | Dec. 13, 1938 |
| 2,146,039 | Whiteley | Feb. 7, 1939 |
| 2,151,592 | Ferris | Mar. 21, 1939 |
| 2,216,602 | Ragatz | Oct. 1, 1940 |
| 2,318,710 | Persyn | May 11, 1943 |
| 2,346,491 | Kiersted | Apr. 11, 1944 |
| 2,379,334 | Atwell | June 26, 1945 |
| 2,444,269 | Phillips | June 29, 1948 |